T. G. MORGAN.
LATHERING IMPLEMENT.
APPLICATION FILED OCT. 8, 1914.
1,146,646.
Patented July 13, 1915.
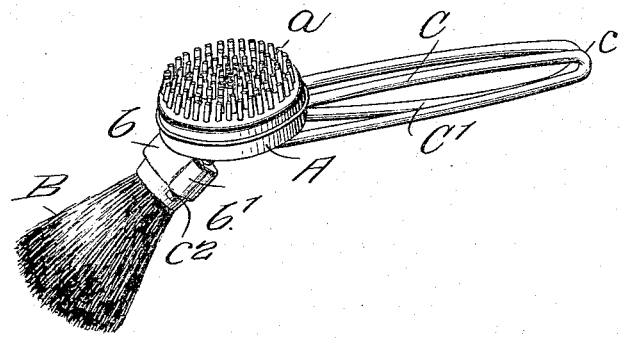
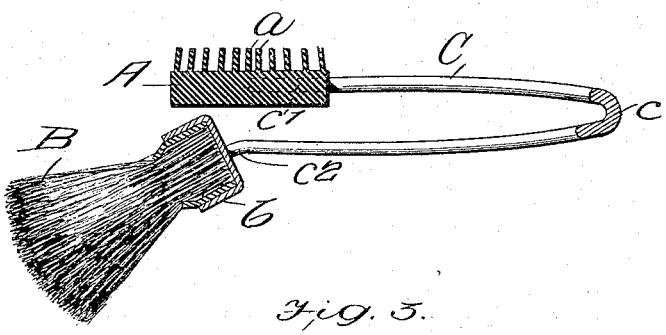
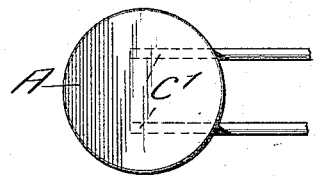
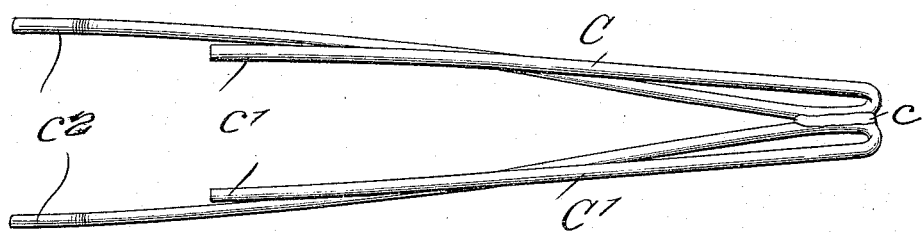
WITNESSES
INVENTOR
Thomas G. Morgan
BY Munn & Co.
ATTORNEYS

UNITED STATES PATENT OFFICE.

THOMAS G. MORGAN, OF SHAMOKIN, PENNSYLVANIA.

LATHERING IMPLEMENT.

1,146,646. Specification of Letters Patent. Patented July 13, 1915.

Application filed October 8, 1914. Serial No. 865,680.

*To all whom it may concern:*

Be it known that I, THOMAS G. MORGAN, a citizen of the United States, and a resident of Shamokin, in the county of Northumberland and State of Pennsylvania, have invented an Improvement in Lathering Implements, of which the following is a specification.

My present invention relates generally to implements for preparing the face preparatory to shaving, and my object is to provide an implement including a lather applying brush and a beard softening member in contiguous though independent relation and with such connections as that they may each be utilized flexibly within limits or rigidly against one another.

In order to accomplish the above I provide an implement generally including a lather applying brush and a rubbing member together with a handle formed of spring wire and with free extremities contiguous to one another to support the brush and rubbing implement, the flexibility of the handle thus formed permitting the implement when grasped lightly in the hand to be utilized with a certain amount of flexibility in either the lather applying or beard softening operations, and enabling said brush and rubbing implement to be forced together and the implement used for either operation in substantially rigid form when the handle is grasped sufficiently tight.

In the accompanying drawing, which illustrates my invention, and forms a part of this specification, Figure 1 is a perspective view of my improved implement. Fig. 2 is a sectional longitudinal section taken therethrough. Fig. 3 is a plan view looking at the inner side of the rubbing implement, and Fig. 4 is a plan view of the handle with the lather applying brush and the rubbing member removed.

Referring now to these figures I have shown a rubbing implement A in the form of a substantially circular elastic pad with integral flexible projections $a$ upon one face thereof, and with spaced and substantially parallel apertures extending into its body, and a brush B, consisting of a tuft of bristles, and mounted within a cap $b$ having diametrically opposite side sockets $b'$, one of which is shown in Fig. 1. I have also shown a handle consisting of a pair of U-shaped spring wires C and C', the rear bent portions of which are secured to one another in juxtaposed relation by suitable means, as for instance soldering or brazing, as shown at $c$, the handle thus having free upper forward extensions $c'$ which are somewhat shorter than the free lower extensions $c^2$. The extensions $c'$ as clearly seen in Fig. 2 are extended within the body apertures of the rubbing member A while the free lower extensions $c^2$ are extended within the side sockets $b'$ of the brush cap $b$. Thus by particular reference to Fig. 2 it will be noted that the brush B and rubbing member A are held adjacent to, though independent from, one another when the handle is grasped lightly and either may be used with a limited flexible movement toward the other in the practical application of the implement. On the other hand the handle may be grasped tightly to force the rubbing member A tightly against the brush B and the implement utilized in either operation in substantially rigid form.

An implement so constructed is particularly useful in that it obviates the necessity of softening the beard with the fingers and in the further fact that it is by its particular construction adapted to light and heavy beards and in its general application needs no adjustment except a mere grasping more or less tightly in the hand of the user.

I claim:—

1. A handle for spaced apart implements comprising diverging U-shaped wire sections, having their rounded outer ends rigidly connected to one another in juxtaposed relation, and having independent free inner ends in upper and lower pairs, upon which the implements may be secured, said free ends of each pair being spaced apart whereby to prevent turning of the implements in use.

2. A handle for spaced apart implements comprising diverging U-shaped wire sections having their rounded outer ends rigidly connected to one another in juxtaposed relation, and having their inner ends arranged in upper and lower pairs, each pair being spaced apart and having free extremities adapted to enter sockets in the implement to be carried thereby.

THOMAS G. MORGAN.

Witnesses:
HOLDEN T. CHESTER,
JOSEPH KLINGER.

Copies of this patent may be obtained for five cents each, by addressing the "Commissioner of Patents, Washington, D. C."